United States Patent [19]

Hsu

[11] Patent Number: 5,392,762
[45] Date of Patent: Feb. 28, 1995

[54] BEVERAGE CAN HEATING DEVICE

[76] Inventor: Yu T. Hsu, No. 221, Ming Der Rd., Ming Der Tsuen, Tour Woei Shiang, Miau Lih Hsien, Taiwan, Prov. of China

[21] Appl. No.: 185,621
[22] Filed: Jan. 24, 1994
[51] Int. Cl.⁶ .................................................. F24J 1/00
[52] U.S. Cl. .................................................. 126/263 R
[58] Field of Search ........................................ 126/263

[56] References Cited

U.S. PATENT DOCUMENTS 3,889,483  6/1975  Donnelly .............................. 126/263
4,838,242  6/1989  Oblon ................................... 126/263

*Primary Examiner*—Carroll B. Dority

*Attorney, Agent, or Firm*—Pro-Techtor International

[57] ABSTRACT

A beverage can heating device includes a container body having a hollow bottom cover filled with water and covered with a plastic film, an inner cylinder having a detachable bottom cap with bottom teeth facing the plastic film, and a chemical material received within the space defined between the container body and the inner cylinder, whereby when a beverage can is inserted into the inner cylinder and pressed against the bottom cap of the inner cylinder, the bottom cap is disconnected from the inner cylinder causing the plastic film pierced by the bottom teeth permitting the chemical material to mix with water in producing a chemical reaction and releasing heat to warm up the contents of the beverage can.

7 Claims, 6 Drawing Sheets

BEVERAGE CAN HEATING DEVICE

BACKGROUND OF THE INVENTION

The present invention relates to a beverage can heating device which produces a chemical reaction to release heat when a beverage can is inserted and depressed, causing the contents of the beverage can warmed up.

A canned food may be heated before service, more particularly during a cold day. Conventionally, electric heaters and gas ranges are commonly used to heat canned foods. However, these heating devices are not suitable for use outdoors. A portable gas stove can be used outdoors for this purpose, but it is not convenient for heating a small amount of beverage cans or the like.

SUMMARY OF THE INVENTION

It one object of the present invention to provide a beverage can heating device which instantly heats the beverage can when the beverage can is inserted and depressed. It is another object of the present invention to provide a beverage can heating device which can be used to heat individual beverage can(s) whenever and wherever one wishes. According to the preferred embodiment of the present invention, the beverage can heating device is comprised of a cylindrical container having a hollow bottom cover filled with water, an inner cylinder disposed within the container, and a chemical material received within the space defined between the container and the inner cylinder. When the beverage can to be heated is inserted into the inner cylinder and pressed down, the bottom cap of the inner cylinder is detached causing the top cover film of the bottom cover of the container pierced, permitting the chemical material to mix with the water, and therefore a chemical reaction is produced, and the beverage can is heated by the heat released from the chemical reaction.

DETAILED DESCRIPTION OF THE PREFERRED EMBODIMENT

Figure 1:
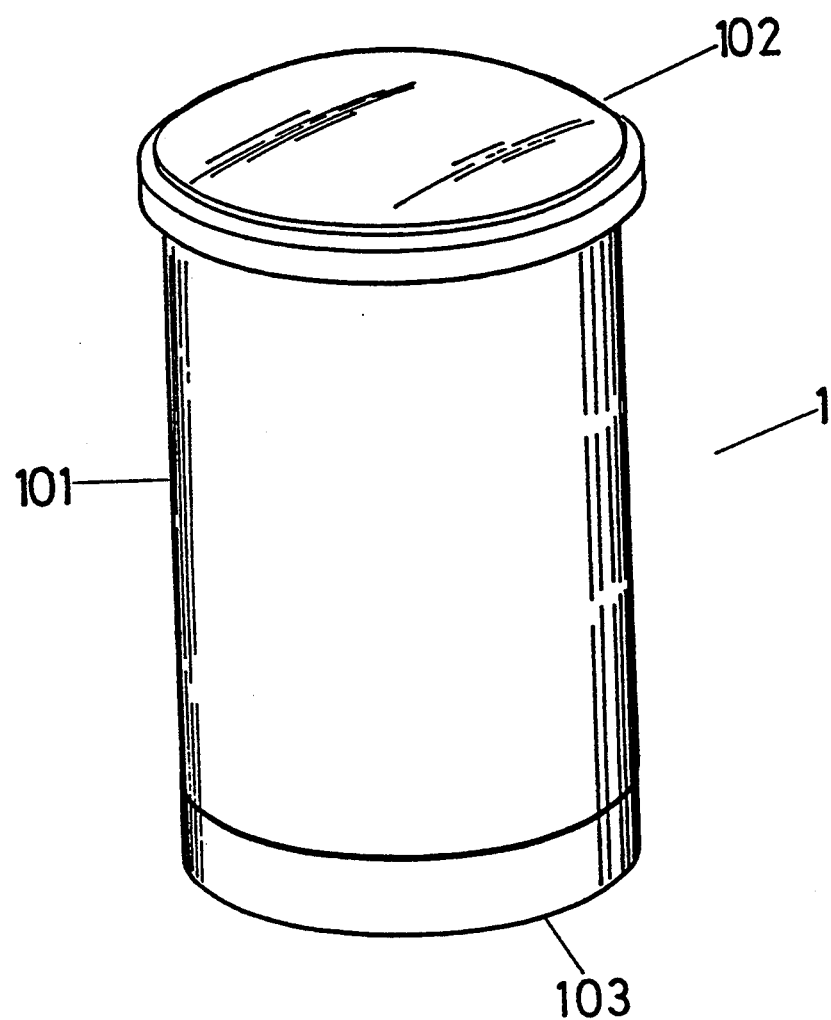
FIG. 1 is an elevational view of a beverage can heating device according to the preferred embodiment of the present invention.
Figure 2:
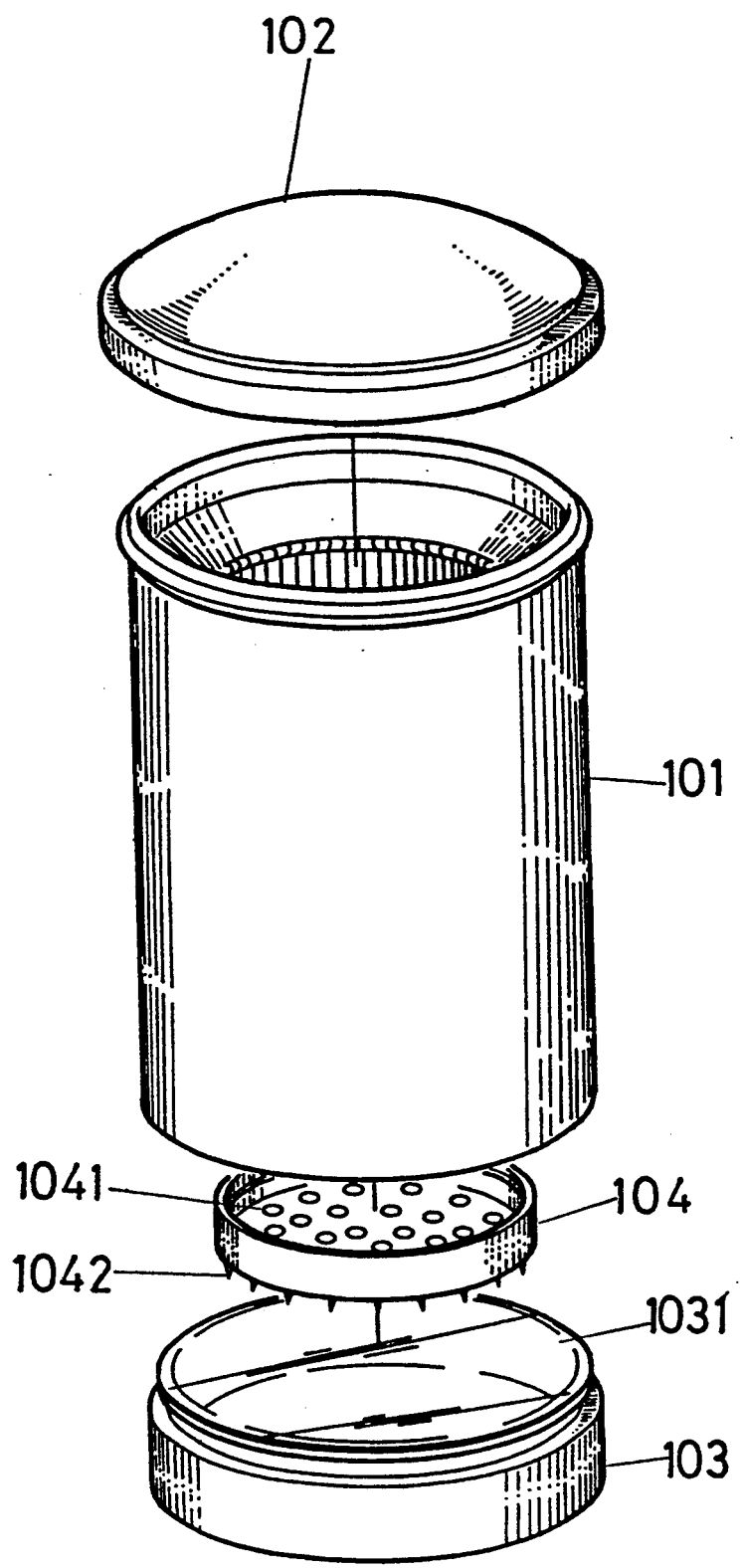
FIG. 2 is an exploded view of the beverage can heating device shown in FIG. 1.
Figure 3:
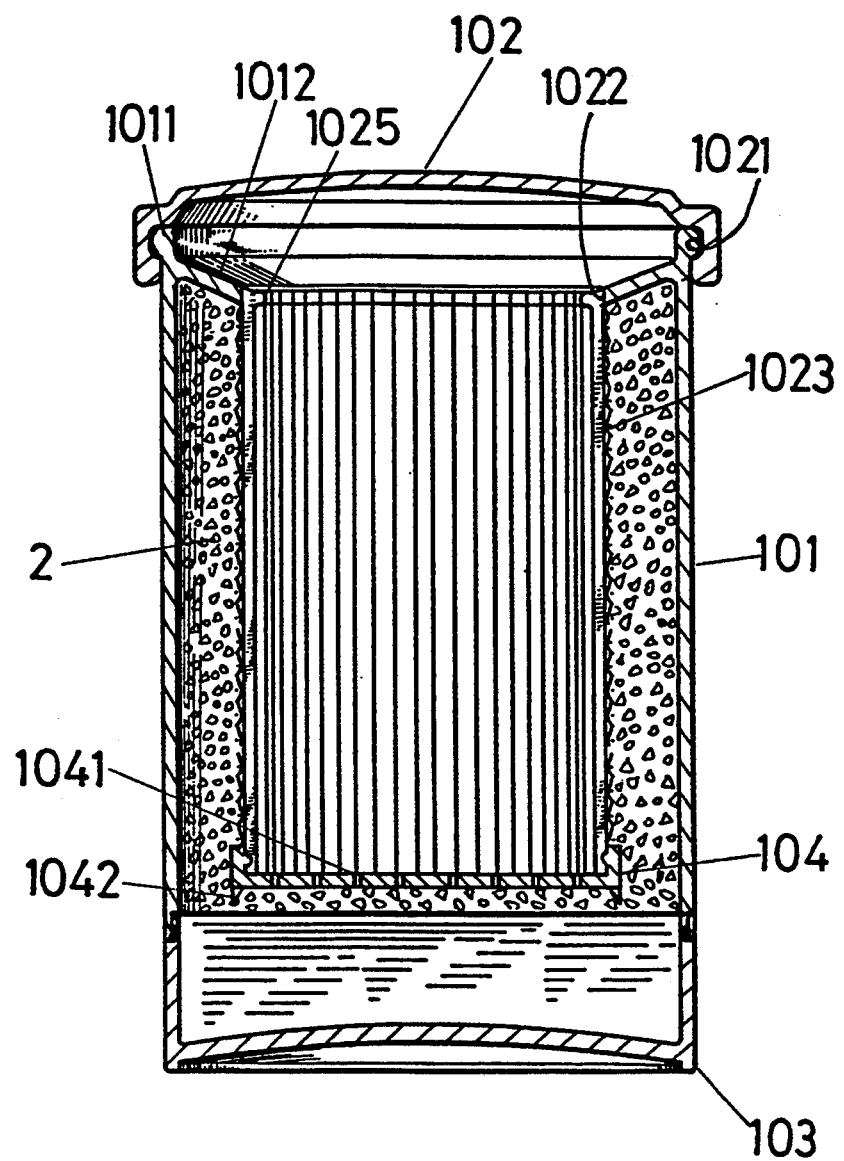
FIG. 3 is a longitudinal view in section of the beverage can heating device shown in FIG. 1.

Referring to FIGS. 2 and 3, a beverage can heating device, referenced by 1, is preferably of injection-molded plastics, comprising a hollow, can-shaped container body 101, a top cover 102 covered on the container body 101 at the top, and a bottom cover 103 covered on the container body 101 at the bottom. The container body 101 has an outward flange 1011 around the top opening thereof. The top cover 102 has an annular mounting groove 1021 on the inside, which receives the outward flange 1011 of the container body 101. The resilience of the material permits the top cover 102 to be deformed, and therefore the top cover 102 can be conveniently mounted on the container body 101 or removed therefrom. The bottom cover 103 is made of hollow structure filled with water and covered with a thin plastic film 1031 at the top.

Figure 4:
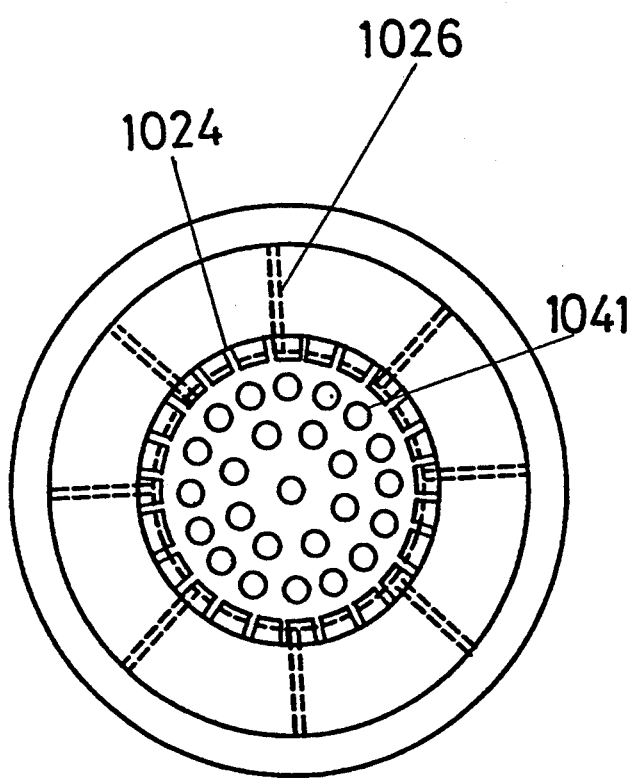
FIG. 4 is a top view of the beverage can heating device shown in FIG. 1 when the top cover removed.
Figure 5:
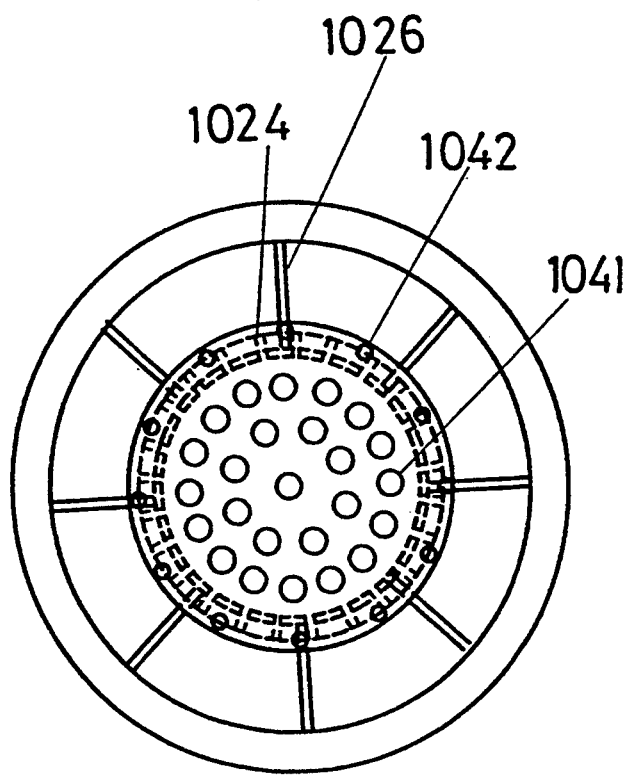
FIG. 5 is a bottom view of the beverage can heating device shown in FIG. 1 when the bottom cover removed.

Referring to FIGS. 4 and 5 and FIG. 3 again, the container body 101 comprises a top sloping wall 1012 made gradually sloping down toward the center of the container body 101. An inner cylinder 1023 is disposed inside the container body 101. The inner cylinder 1023 has a top opening connected to the border 1022 of the top sloping wall 1012, and a bottom opening covered by a detachable cap 104. The cap 104 is fastened to the inner cylinder 1023 through a tongue-and-groove joint, having a plurality of through holes 1041 and a plurality of pointed teeth 1042 facing the plastic film 1031 on the bottom cover 103. There is an inward flange 1025 extended from the top sloping wall 1012 and projected toward the center of the top opening of the inner cylinder 1023. The inner cylinder 1023 further comprises a plurality of narrow, longitudinal slots 1024 spaced around the periphery thereof. A plurality of radial ribs 1026 are connected between the inside wall of the container body 101 and the outside wall of the inner cylinder 1023, defining a plurality of compartments, which receive a chemical material 2. The chemical material 2, for example: quicklime, releases heat when mixed with water.

Figure 6:
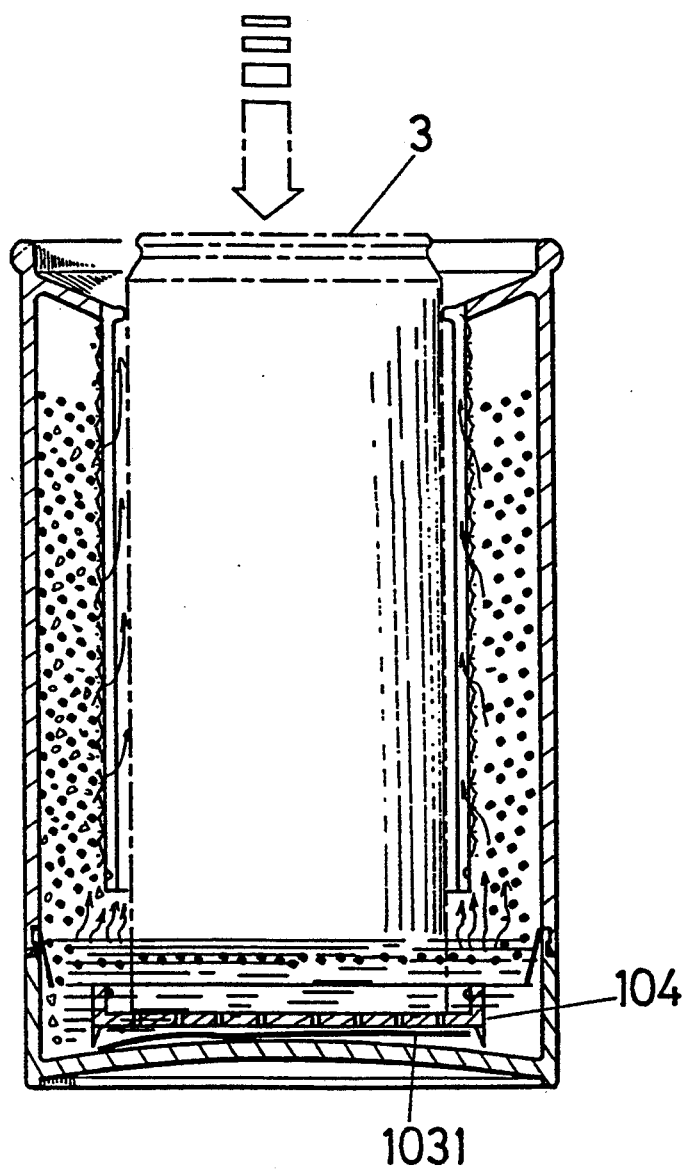
FIG. 6 is an applied view showing a beverage can inserted into the beverage can heating device and heated (cooled).

Referring to FIG. 6, a beverage can 3 is inserted into the inner cylinder 1023 and pressed down causing the cap 104 disconnected from the inner cylinder 1023, at the same time the pointed teeth 1042 are forced to pierce through the plastic film 1031, and therefore the chemical material 2 drops into the cap 104 to mix with water. When the chemical material 2 is mixed with water, a chemical reaction is produced to release heat. The rising flow of hot air which is induced by the chemical reaction will be stopped by the top sloping wall 1012 and guided to flow toward the beverage can 3 through the narrow, longitudinal slots 1024 in heating the contents of the beverage can 3.

The arrangement of the radial ribs 1026 is to keep the chemical material 2 in place before the service of the beverage can heating device. The radial ribs 1026 are also functioned as retainer means to keep the induced hot flow of hot air warm up the beverage can 3 uniformly.

While only one embodiment of the present invention has been shown and described, it will be understood that various modifications and changes could be made without departing from the spirit and scope of the invention. For example, the connection between the top cover 102 and the container body 101 may be made through a screw joint.

What is claimed is:

1. A beverage can heating device comprising a container body, said container body having a top sloping wall extended downwardly inwards from a top opening thereof, and a bottom opening covered with a hollow bottom cover, said hollow bottom cover of said container body being filled with water and having a top opening covered with a thin plastic film; an inner cylinder, said inner cylinder comprising a top edge surrounding a top opening thereof and connected to said top sloping wall, and a bottom opening covered with a detachable bottom cap, said bottom cap of said inner cylinder comprising a plurality of pointed teeth at the bottom facing said plastic film; and a chemical material received within the space defined between said container body and said inner cylinder and said bottom cover of said container body, and whereby when a beverage can is inserted into said inner cylinder and pressed against said bottom cap of said inner cylinder, said bottom cap of said inner cylinder is disconnected from said inner cylinder causing said plastic film pierced by said pointed teeth permitting said chemical material to mix with water in producing a chemical reaction and releasing heat to warm up the contents of the beverage can.

2. The beverage can heating device of claim 1 further comprising a plurality of radial ribs connected between said container body and said inner cylinder.

3. The beverage can heating device of claim 1 wherein said inner cylinder comprises a plurality of longitudinal air gaps spaced around the periphery thereof.

4. The beverage can heating device of claim 1 wherein said top cover of said container body is fastened to said container body by a tongue-and-groove joint.

5. The beverage can heating device of claim 1 wherein said top cover of said container body is fastened to said container body by a screw joint.

6. The beverage can heating device of claim 1 wherein said bottom cap of said inner cylinder comprises a plurality of bottom through holes.

7. The beverage can heating device of claim 1 wherein said inner cylinder comprises an inward annular flange projected from the top opening thereof.

* * * * *